United States Patent [19]

Jourdain et al.

[11] Patent Number: 5,069,034

[45] Date of Patent: Dec. 3, 1991

[54] HEAT PROTECTIVE LINING FOR AN AFTERBURNER OR TRANSITION DUCT OF A TURBOJET ENGINE

[75] Inventors: Gérard E. A. Jourdain, Saintry Sur Seine; Marc G. Loubet, Nandy, both of France

[73] Assignee: Societe Nationale d'Etude et de Construction de Moteurs d'Aviation "S.N.E.C.M.A.", Paris, France

[21] Appl. No.: 521,036

[22] Filed: May 8, 1990

[30] Foreign Application Priority Data

May 11, 1989 [FR] France ................ 89 06174

[51] Int. Cl.⁵ .................... F02R 3/10; F02C 7/20
[52] U.S. Cl. ........................... 60/261; 60/752; 60/757; 60/39.31
[58] Field of Search ............... 60/261, 752, 753, 755, 60/757, 39.31, 39.32

[56] References Cited

U.S. PATENT DOCUMENTS

| | | | |
|---|---|---|---|
| 2,651,912 | 9/1953 | Abbott | 60/755 |
| 3,422,620 | 5/1967 | Fantozzi | 60/755 |
| 4,614,082 | 9/1986 | Sterman . | |
| 4,628,694 | 12/1986 | Kelm | 60/752 |
| 4,773,227 | 9/1988 | Chabis . | |

FOREIGN PATENT DOCUMENTS

| | | | |
|---|---|---|---|
| 3535442 | 4/1987 | Fed. Rep. of Germany | 60/752 |
| 1221234 | 5/1960 | France . | |
| 1435410 | 3/1966 | France . | |
| 1458204 | 10/1966 | France . | |
| 2271405 | 12/1975 | France . | |
| 2567250 | 1/1986 | France . | |
| 2574859 | 6/1986 | France . | |
| 781923 | 8/1957 | United Kingdom . | |
| 2087065 | 5/1982 | United Kingdom . | |
| 2113377 | 8/1983 | United Kingdom | 60/752 |

*Primary Examiner*—Louis J. Casaregola
*Assistant Examiner*—John A. Savio, III
*Attorney, Agent, or Firm*—Oblon, Spivak, McClelland, Maier & Neustadt

[57] ABSTRACT

A heat protective lining for the afterburner or transition duct of a turbojet engine comprises an assembly of tiles overlapping laterally and longitudinally to form overlapping rings of tiles in which the tiles of each ring are offset laterally from those of each adjacent ring by half a tile width. The tiles are held together by eyelets projecting from the overlapped downstream portions of the tiles through apertures in the overlapping upstream portions, and locking members engaging through the eyelets. Fastening yokes for fixing the assembly to the duct casing are secured to the outside of the tiles.

10 Claims, 6 Drawing Sheets

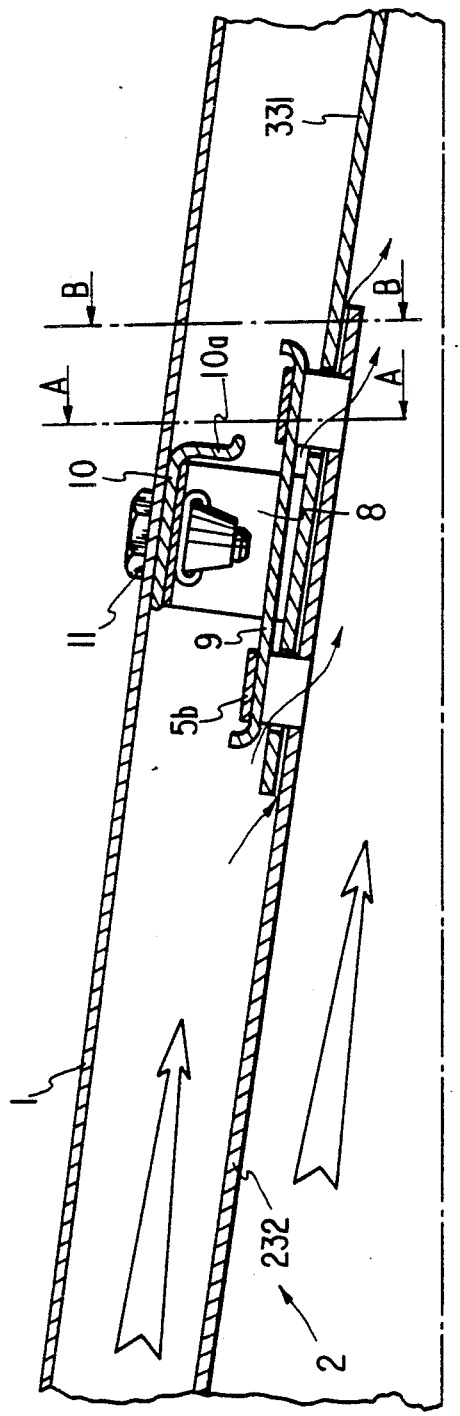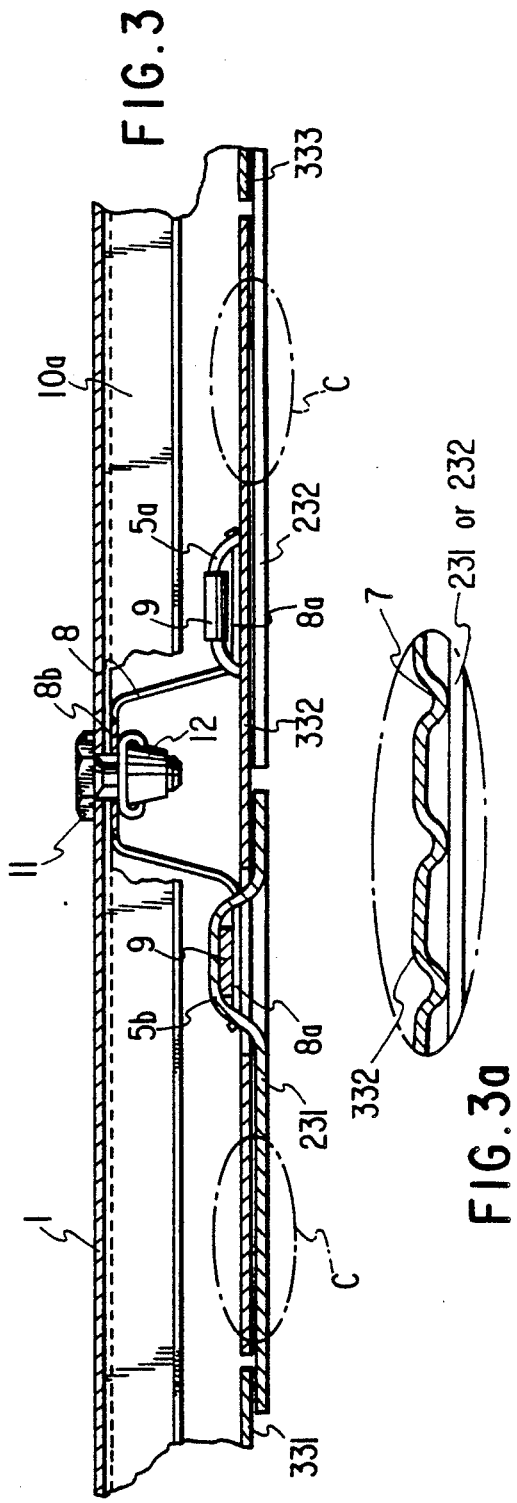

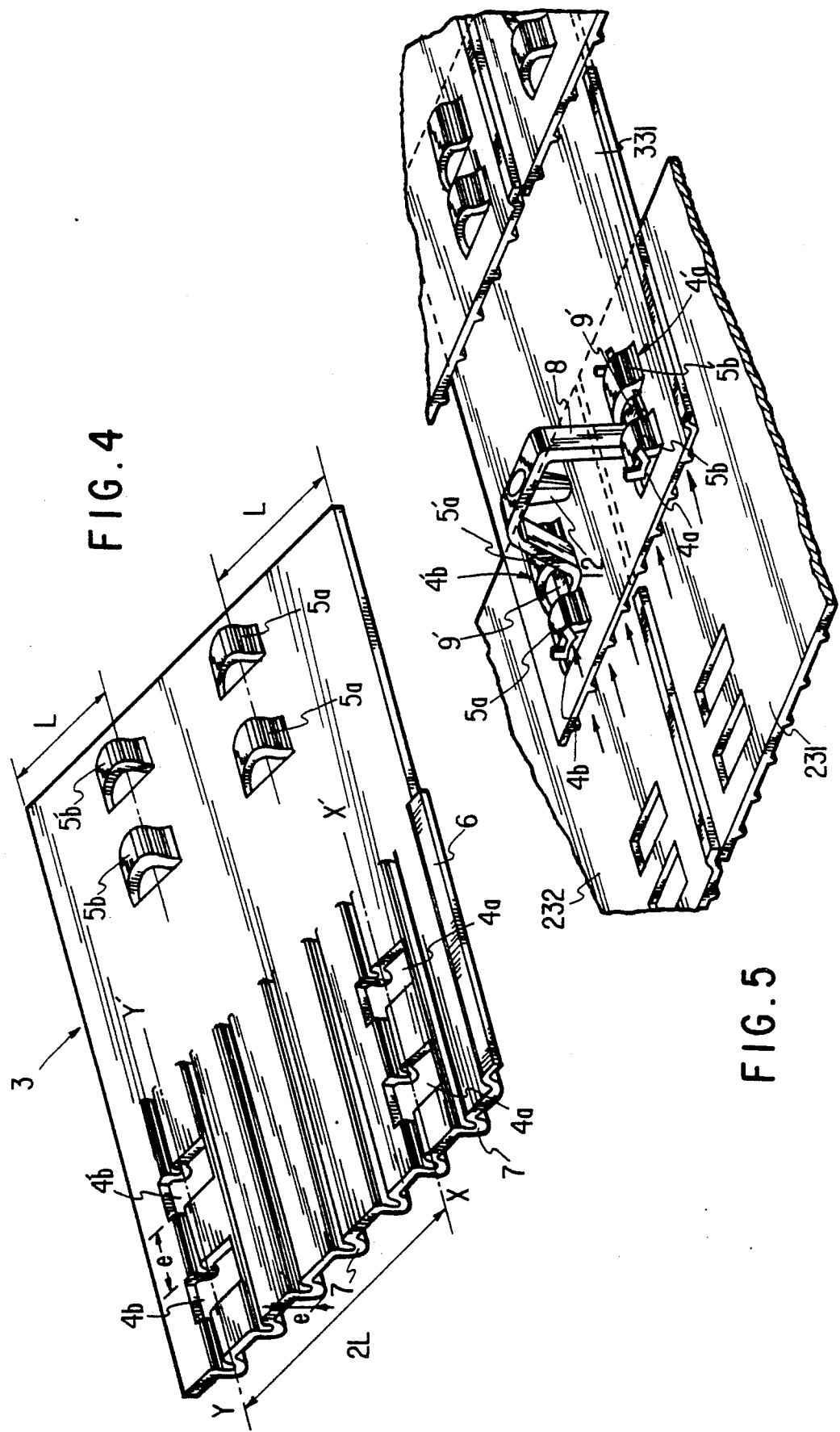

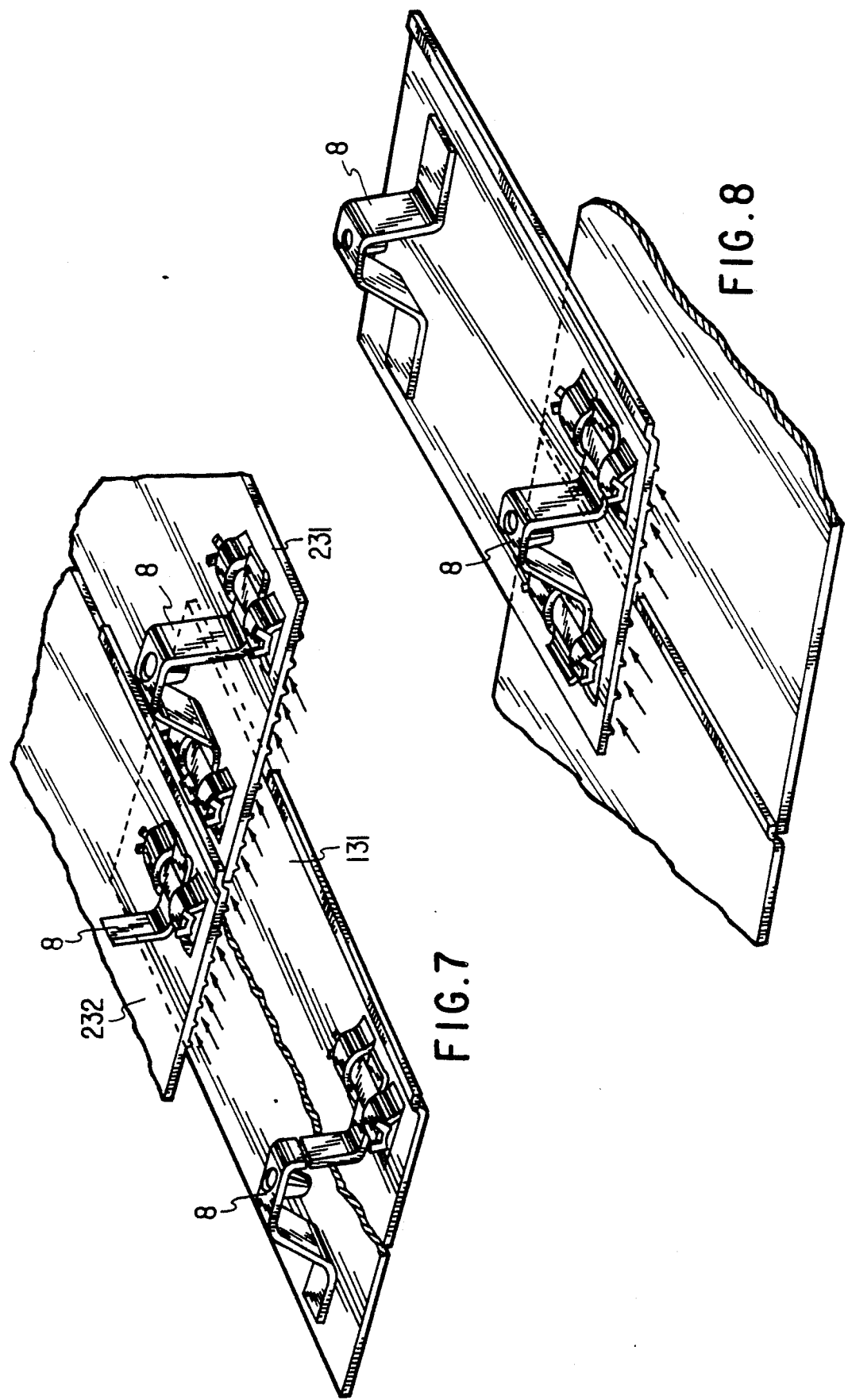

HEAT PROTECTIVE LINING FOR AN AFTERBURNER OR TRANSITION DUCT OF A TURBOJET ENGINE

BACKGROUND OF THE INVENTION

1. Field of the Invention

The present invention relates to a heat protective lining for an afterburner duct or transition duct in a turbojet aero-engine.

Most supersonic turbojet engines are equipped with an afterburner arrangement. This is in the form of a duct which is situated between the turbine and the nozzle and to which fuel pipes supply additional fuel to complete the combustion of the hydrocarbons not burnt in the combustion chamber, thereby raising the temperature of the exhaust gases. The supply of fuel is considerable and high temperatures are reached of the order of 2100° K mean exhaust temperature), and locally these temperatures may reach 2200° K.

For turbojet engines fitted with axisymmetrical nozzles the duct is cylindrical in shape, and is connected upstream to the downstream collar of the exhaust housing, and downstream directly to the upstream ring of the nozzle. When the turbojet engine is equipped with a bidimensional nozzle, the afterburner duct is connected downstream to a transition duct which effects the change from a circular section to a rectangular or square section.

In view of the temperatures prevailing in the said ducts, it is essential to protect them by means of a heat protective lining. This lining is held spaced from the inner wall of the duct and coaxially with it by sliding ties. A flow of cooling air, which may be from the secondary air in the case of a bypass engine, passes between the inner wall of the duct and the outer wall of the lining.

2. Summary of the Prior Art

French Patent 1 458 204 describes a protective lining made in the form of a unitary structure having a corrugated wall. It is connected to the duct by fixed points and sliding points enabling it to expand during operation, longitudinal expansion being accommodated by the sliding points and radial expansion by deformation of the corrugations.

French Patent 2 574 859 discloses a protective lining having various cooling means. One part has a double wall cooled by impact and convection, whereas the downstream part has folds for the formation of a cooling film by internal convection. As in the Previous case, this device has the drawback that it is a one-piece unit.

In the neighbouring, but different, field of the manufacture of burners for the combustion chambers of turbojet engines, double-wall combustion chamber structures are also known, the structural outer wall bearing inner panels constituting the hot wall, the said panels being arranged in the form of overlapping tiles. U.S. Pat. No. 4,614,082, French Patent 2 567 250, British Patent 2 087 065, and U.S. Pat. No. 4,773,227 disclose examples of this arrangement.

SUMMARY OF THE INVENTION

The aim of the present invention is to provide a heat protective lining for an afterburner or transition duct of a turbojet engine using the concept of overlapping tiles mentioned above, but in which the tiles are not fixed separately on a structural wall but are mutually fixed together to produce a heat protective lining which is complete and separable as a whole from the duct in which the lining will be disposed.

To this end, according to the invention there is provided a heat protective lining for the casing of an afterburner duct or transition duct of a turbojet engine, said lining comprising a plurality of tiles disposed in side by side and longitudinally overlapping relation to form a structural lining assembly for mounting on said duct casing, said lining assembly being composed of longitudinally overlapping rings of said tiles wherein the tiles of each ring are laterally offset by half the width of a tile with respect to the tiles of each adjacent ring, each of said tiles of at least the rings intermediate the upstream and downstream endmost rings having an upstream portion including at least two apertures and a downstream portion including at least two eyelets projecting from the outer face thereof, and each tile of the downstream ring of each pair of adjacent rings having its upstream portion overlapping part of the downstream portions of two adjacent tiles of the upstream ring of said pair of rings whereby said apertures of said overlapping downstream tile receive therethrough respective eyelets of said two overlapped upstream tiles, said lining assembly including locking means engaging with said eyelets projecting through said apertures to hold said tiles together, and fastening yokes secured to the outer faces of said tiles for the fixing of said assembly to said casing.

With this arrangement the invention enables the achievement of a structural lining assembly in which each tile possesses a certain degree of radial, axial and circumferential freedom relative to its adjacent tiles.

Other features of the invention and the way it is put into practice will become apparent from the following description of the preferred embodiments with reference to the attached drawings.

BRIEF DESCRIPTION OF THE DRAWINGS

FIG. 1 is a longitudinal sectional view of part of one embodiment of a protective lining in accordance with the invention assembled and fixed in a hot duct of a turbojet engine together with a stiffening ring.

FIG. 3 shows on the left hand side a partial cross-section along the line A—A in FIG. 1, and on the right hand side a partial cross-section along the line B—B in FIG. 1.

FIG. 3a shows the detail C of FIG. 3, on a larger scale.

FIG. 4 is a perspective view of one of the tiles which may be used in the embodiment of FIGS. 1 to 3.

FIG. 5 is a partial top perspective view from the upstream end of a modified form of the embodiment of FIGS. 1 to 3, having a locking bar designed to improve the flow of cooling air.

FIG. 7 is a view similar to that of FIG. 5, but showing two alternative arrangements for the tiles of the upstream end ring of the heat protective lining.

FIG. 8 is a view similar to that of FIG. 5, but showing a modified form of tile for use in the end downstream end ring of the heat protective lining.

DESCRIPTION OF THE PREFERRED EMBODIMENTS

Figure 2:
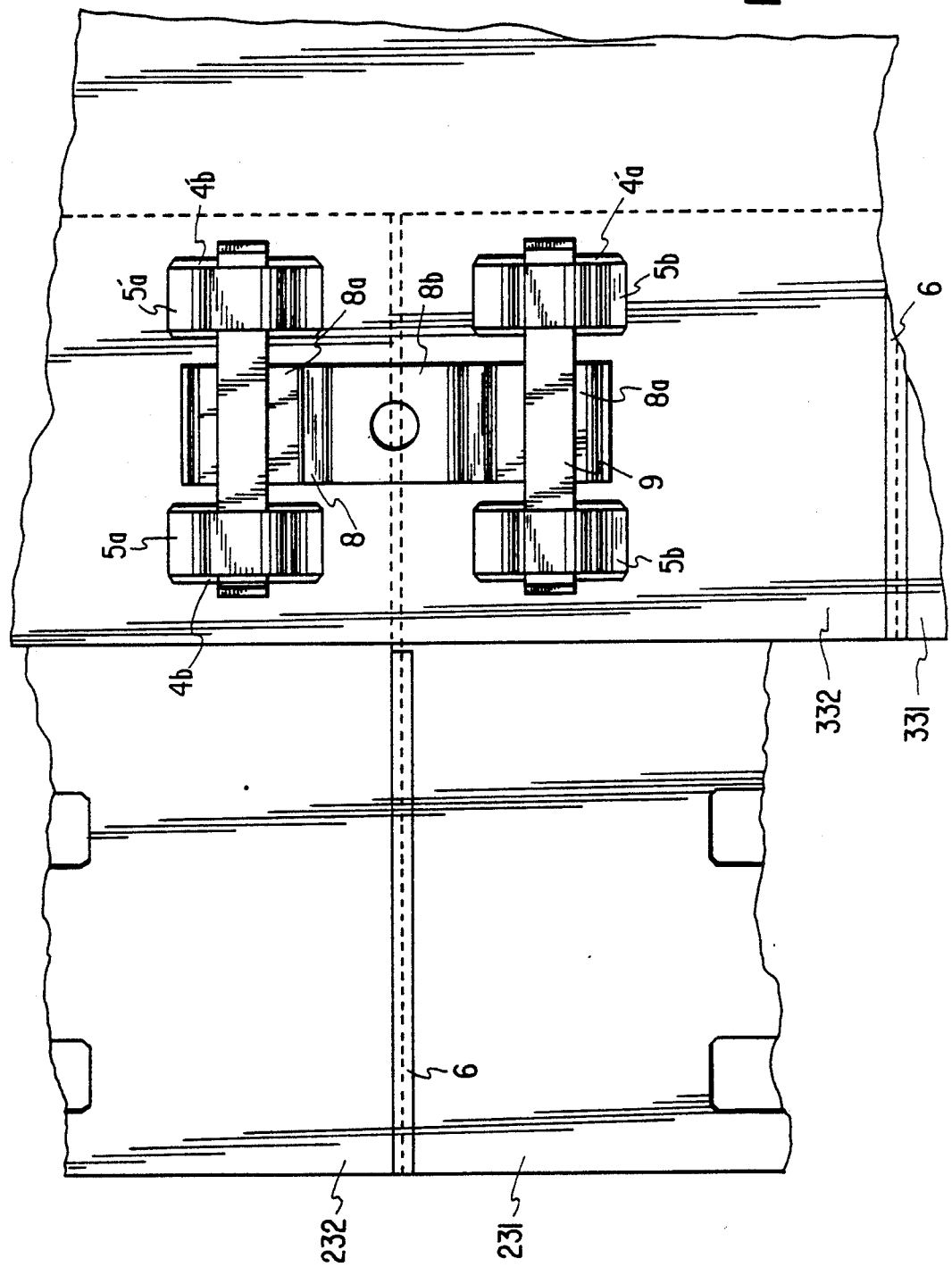
FIG. 2 is a top plan view of part of the heat protective lining of FIG. 1 shown without the stiffening ring.

With reference to FIGS. 1 to 5 it will be seen that the afterburner duct 1 or the transition duct between an afterburner duct and a bidimensional nozzle is protected internally by a protective lining denoted generally by 2 and formed of tiles.

In the drawings and the following description the tiles of the lining will be identified according to the following convention. All tiles will be given a three-figure number; the first figure representing the lining ring or row in which the tile is incorporated; the second figure always being FIG. 3 and denoting the tile per se (such as shown for example in FIG. 4); and the third figure representing the position of the tile in its ring.

The tiles of the first upstream ring will thus be referenced 13$l$ to 13$n$, those of the second ring will be referenced 23$l$ to 23$n$, and those of the downstream end ring will be referenced n3$l$ to n3$n$.

FIG. 4 shows an individual tile 3 removed from the lining, the upstream edge of the tile being shown on the left of the drawing and the downstream edge on the right, the tile being seen from above.

In the embodiment illustrated in FIG. 4 the tile has two pairs of apertures, respectively 4$a$, r'$a$ and 4$b$, 4'$b$, formed in its upstream half. The apertures 4$a$ and 4'$a$ are arranged on a common longitudinal axis XX' and are separated by a distance "e", and similarly the apertures 4$b$, 4'$b$ are arranged on a common longitudinal axis YY' and are also separated by a distance "e". The axes XX' and YY' are arranged symmetrically relative to the central longitudinal axis of the tile and are separated by a distance 2L.

In its downstream half the tile has two pairs of eyelets 5$a$, 5'$a$ and 5$b$, 5'$b$. Each eyelet is press-formed (if the tile is made from a metallic material) or integrally cast (if the tile is made of a composite or ceramic material) and protrudes from the top face of the tile in the form of a semi-cylinder. The eyelets 5$a$, 5'$a$ and 5$b$, 5'$b$ are spaced from the left and right edges, respectively, of the tile by a distance L.

The tile also has, along approximately the upstream half of one of its side edges, an overlap strip 6 which will cover the adjacent edge of the adjacent tile upon assembly.

In addition, the upstream part of the tile has on its underside pressed longitudinal corrugations 7 of constant height such as represented in FIG. 4. Alternatively, the underside of the upstream part of the tile may be provided with bosses or studs 7' in a staggered arrangement as shown in FIGS. 3$a$, 9 and 11. In either case, when the tiles are set in place in the lining with the upstream part of each tile overlapping the downstream parts of two tiles of the adjacent upstream ring, a space "e" is retained radially between the outer face of each upstream tile and the inner face of the downstream tile so that the relatively cold air flowing between the lining 2 and the casing 1 can enter inside the lining to form along its inner wall a parietal cooling film as will be described further hereinbelow.

FIGS. 1 to 3 illustrate the fitting of tiles in two assembled successive rings, for example the second and third rings. It will thus be seen in FIGS. 1 and 2 that adjacent tiles 231 and 232 of the upstream ring have their downstream parts overlapped by the tile 332 of the downstream ring, and are arranged in such a way that the downstream eyelets 5$b$, 5'$b$ of the tile 231 project through the upstream apertures 4$a$, 4'$a$ of the tile 332 while the downstream eyelets 5$a$, 5'$a$ of the tile 232 project through the apertures 4$b$, 4'$b$ of the same downstream tile 331.

A fastening yoke 8 of inverted U-shape having end wings 8$a$ parallel to its central part 8$b$ is then placed externally on the tile 332 and transversely so that one of the wings 8$a$ is located in the space "e" separating the eyelets 5$b$, 5'$b$ of tile 231 protruding through the apertures 4$a$, 4'$a$ of the tile 332, while the other wing is located between the eyelets 5$a$, 5'$a$ of the tile 232 protruding through the apertures 4$b$, 4'$b$ of the same tile 332. Two locking bars 9 are then slid longitudinally through the two pairs of eyelets 5$b$, 5'$b$ and 5$a$, 5'$a$ to overlie the wings 8$a$, thereby securing the tiles together and the yoke to the tiles.

When all the tiles 331 to 33$n$ of the downstream ring are thus connected to the tiles 23$l$ to 23$n$ of the upstream ring, a peripheral stiffening ring 10 is placed therearound on the central parts 8$b$ of all the yokes 8 and is secured to the yokes by means of screws 11 inserted from outside the casing 1 into engagement with captive lock-nuts 12 carried by the central parts 8$b$ of the yokes. The screws 11 thus act to secure the lining 2 to the casing 1.

Each stiffening ring 10 of the lining 2 has a downstream flange 10$a$ folded radially inwards with respect to the duct in order to form an aerodynamic diaphragm upstream of the ring which pressurizes the secondary air flowing between the lining 2 and the casing 1 in the upstream region of the corresponding downstream ring of tiles (331 to 33$n$ in FIGS. 1 to 3).

As a result of the presence of the studs or corrugations 7, 7', the upstream 231, 232 and downstream 332 tiles are spaced by the height e' of the said studs or corrugations, and the secondary air pressurized by the diaphragm formed by the flange 10$a$ finds its way between the tiles 231, 232 and the tile 332 to form a cooling flow between the said tiles. The air may also pass under the locking bars 9. The relatively cool air which passes between the tiles, together with that which passes under the bars 9 and through the apertures 4$a$, 4'$a$, 4$b$, 4'$b$, reaches the inside of the protective lining 2 and forms a parietal cooling film along the inner wall of the lining.

FIG. 5 shows in perspective part of an assembly thus formed to produce a protective lining in accordance with the invention. In this drawing all the components shown are in conformity with the description just given, with the exception of the locking bars 9' which are modified to have a semi-circular section in order to improve the intake of cooling air for forming the parietal cooling film of the lining 2. In addition, in FIGS. 5 to 8, the spacer studs or corrugations 7, 7' are shown formed in relief as an alternative, this not altering the principle of the tile ventilation which is achieved.

Figure 6:
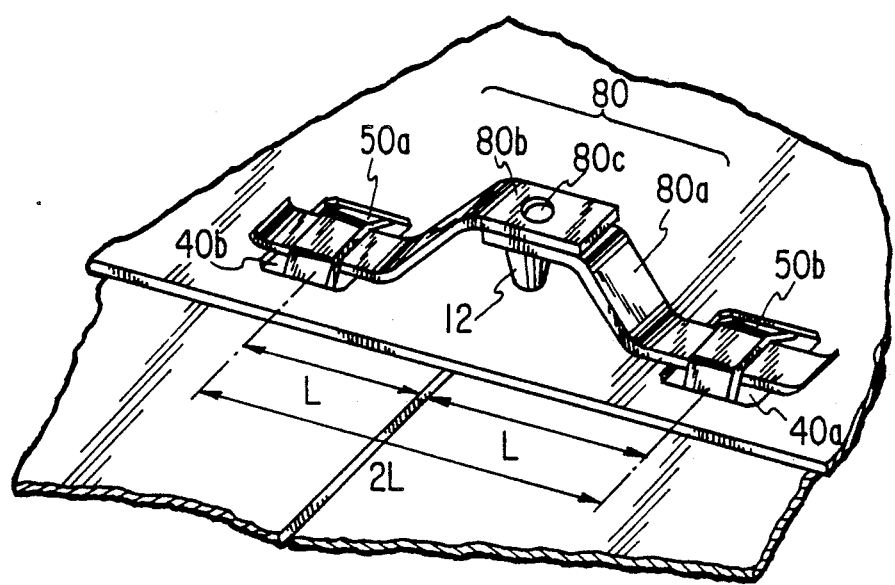
FIG. 6 is a view similar to that of FIG. 5, but illustrating an alternative embodiment employing a different arrangement for the eyelets and fastening yokes.
Figure 9:
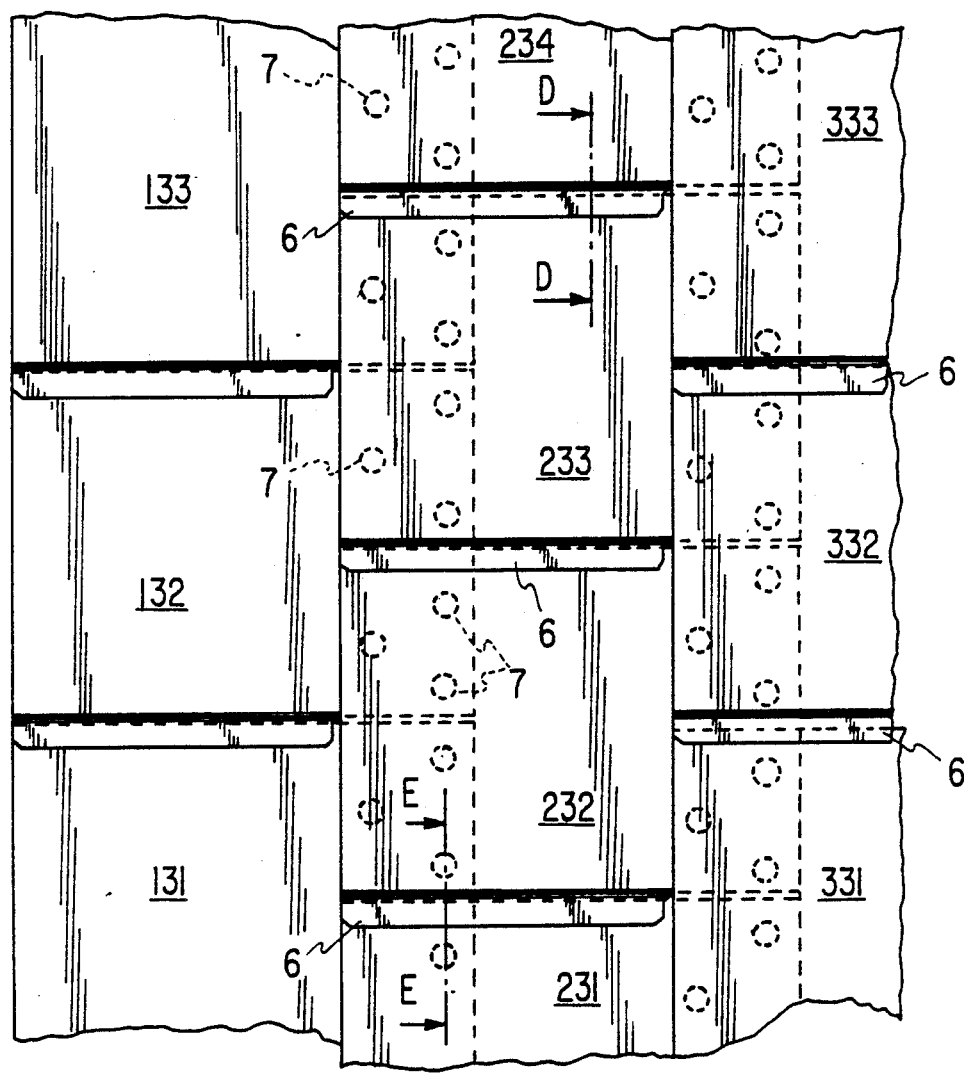
FIG. 9 is a partial top plan view of an assembled protective lining showing the sealing system between the tiles, the fixing means of the tiles being omitted for clarity.
Figure 10:
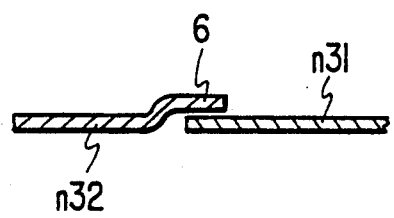
FIG. 10 is a scrap sectional view along line D—D in FIG. 9.
Figure 11:
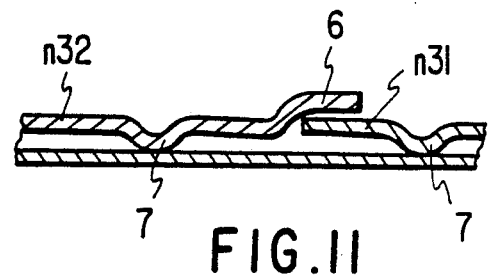
FIG. 11 is a scrap sectional view along line E—E in FIG. 9.

In the alternative embodiment shown in FIG. 6, the downstream pairs of eyelets of each tile have been replaced by single longitudinal eyelets 50$a$, 50$b$. Similarly the upstream pairs of apertures are replaced by single apertures 40$a$, 40$b$. The spaces between the apertures, and the spaces between the eyelets relative to the edges of the tiles are the same as in the previous embodiment.

In this case, to facilitate insertion of the fastening yoke 80, the yoke is made in the form of two half-yokes 80a, 80b which are respectively engaged through the eyelets 50b and 50a. The two half-yokes each have a central overlapping portion, one being provided with an opening 80c while the other supports the captive nut 12. The two-half yokes are thus connected together and to the stiffening ring 10 by means of the screws 11.

FIG. 7 shows a tile of the upstream end ring fixed to two tiles of the second ring as described earlier, the left and right hand halves of the upstream tile illustrating two alternative constructions for the tile. The construction shown on the left may be used when the tile 13n is made of metal. In this case, the tile has no upstream aperture but has a welded or riveted fastening yoke for the connection of the tile 13n to the afterburner duct. This connection is achieved by means of screws passing through the duct wall and into the friction locknuts 12 of the yokes. The tiles 13n making up the upstream end ring are not overlapping at their upstream end and do not therefore require inner bosses or corrugations.

The construction shown in the right-hand half of the upstream tile in FIG. 7 may be used when the tile is of composite material. In this case the tile may have upstream eyelets, and the upstream fastening yoke will be connected to the tile by means of locking bars as described earlier for the downstream rings.

In FIG. 8 a tile of the endmost downstream ring is shown having its upstream end overlapping and secured to two tiles of the adjacent upstream ring as described earlier. However, since its downstream end is not overlapped, it is not provided with eyelets in this region. Instead, a fastening yoke 8 is arranged on the downstream end of the tile in a manner similar to the yokes on the upstream ends of the endmost upstream ring. The downstream ring is fixed to the duct by screws engaging in the friction locknuts 12 of the yokes 8.

It should be noted that the width of the yokes is calculated so as to leave between the said yokes and the eyelets, or the pairs of corresponding eyelets, a clearance permitting the longitudinal expansion of the assembly of tiles constituting the said heat protective lining.

Similarly, radial expansion is allowed as the rings are relatively free radially with respect to one another, the height of the bosses forming the eyelets being calculated with adequate clearance to permit such expansion.

A protective lining of the type described herein has the advantage that it is possible to replace individually any tile which is found defective during operation, and that it is possible to do this on an air base without needing to strip the engine in a workshop, thus avoiding lengthy immobilization of the engine and of the aircraft to which it belongs. In addition, the range of spare parts required to be stocked is reduced considerably by the modular structure of the lining.

We claim:

1. A heat protective lining for the casing of an afterburner duct or transition duct of a turbojet engine, said lining comprising a plurality of tiles disposed in side by side and longitudinally overlapping relation to form a structural lining assembly for mounting in said duct casing, said lining assembly being composed of longitudinally overlapping rings of said tiles wherein the tiles of each ring are laterally offset by half the width of a tile with respect to the tiles of each adjacent ring, each of said tiles of at least the rings intermediate the upstream and downstream endmost rings having an upstream portion including at least two apertures and a downstream portion including at least two eyelets projecting from the outer face thereof, and each tile of the downstream ring of each pair of adjacent rings having its upstream portion overlapping part of the downstream portions of two adjacent tiles of the upstream ring of said pair of rings whereby said apertures of said overlapping downstream tile receive therethrough respective eyelets of said two overlapped upstream tiles, said lining assembly including locking means engaging with said eyelets projecting through said apertures to hold said tiles together, and fastening yokes secured to the outer faces of said tiles for the fixing of said assembly to said casing.

2. A heat protective lining according to claim 1, wherein each tile of at least said rings intermediate the upstream and downstream endmost rings has two apertures in its upstream portion disposed symmetrically relative to the central longitudinal axis of said tile and spaced apart by a distance 2L, and two eyelets in its downstream portion disposed symmetrically relative to said central longitudinal axis of the tile and spaced from the side edges of said tile by a distance L, and wherein said fastening yokes each comprise two half-yoke members which form said locking means of said lining assembly, each half-yoke member having a first end which extends through one of said eyelets projecting through its respective aperture and a second end which overlaps the second end of its other half-yoke member, said second ends having registering openings for receiving a screw to fasten said two half-yoke members together.

3. A heat protective lining according to claim 1, wherein each tile of at least said rings intermediate the upstream and downstream endmost rings has two pairs of apertures in its upstream portion aligned on longitudinal axes which are disposed symmetrically relative to the central longitudinal axis of said tile and are spaced apart by a distance 2L, and has two pairs of eyelets in its downstream portion aligned on longitudinal axes which are disposed symmetrically relative to said central longitudinal axis of the tile and are spaced from the side edges of said tile by a distance L, and wherein each of said fastening yokes is of unitary construction and has its two opposite ends each arranged transversely between a pair of said longitudinally aligned eyelets projecting through their respective apertures, and said locking means comprises a plurality of locking bars each of which is inserted through a respective pair of longitudinally aligned eyelets and over the end of the yoke which is disposed therebetween to secure said yokes on said tiles.

4. A heat protective lining according to claim 3, wherein said locking bars have a semi-circular section to facilitate the introduction of cooling air through said eyelets and said apertures to form a parietal cooling air film on the inner face of said tiles.

5. A heat protective lining according to claim 1, wherein said upstream portion of each tile has, in the area where it overlaps said tiles upstream thereof, corrugations or studs which maintain a spacing between said overlapping tiles to permit the introduction of secondary air from outside the lining assembly through the assembly to form a parietal cooling air film over the inner face of said tiles.

6. A heat protective lining according to claim 1, wherein said lining assembly includes a circumferential stiffening ring for each ring of said tiles, said stiffening ring being connected to all of the fastening yokes on said ring of tiles by means of screws cooperating with locknuts carried by said yokes.

7. A heat protective lining according to claim 6, wherein each of said stiffening rings has a downstream annular flange folded inwards to form upstream of said ring a diaphragm for the pressurization of cooling air.

8. A heat protective lining according to claim 6, wherein said screws are fitted from outside said casing and serve to fix said lining assembly to said casing on the inside thereof.

9. A heat protective lining according to claim 1, wherein the height of said eyelets is selected to provide sufficient play to permit radial expansion of said assembly of tiles constituting said lining.

10. A heat protective lining according to claim 1 or claim 3, wherein the width of each fastening yoke is selected so as to leave between said yoke and its respective eyelets sufficient clearance to permit longitudinal expansion of said assembly of tiles constituting said lining.

* * * * *